Jan. 23, 1968   Z. E. HUFSTEDLER ET AL   3,364,699
ANTI-FRICTION SLIP JOINT
Filed March 22, 1965
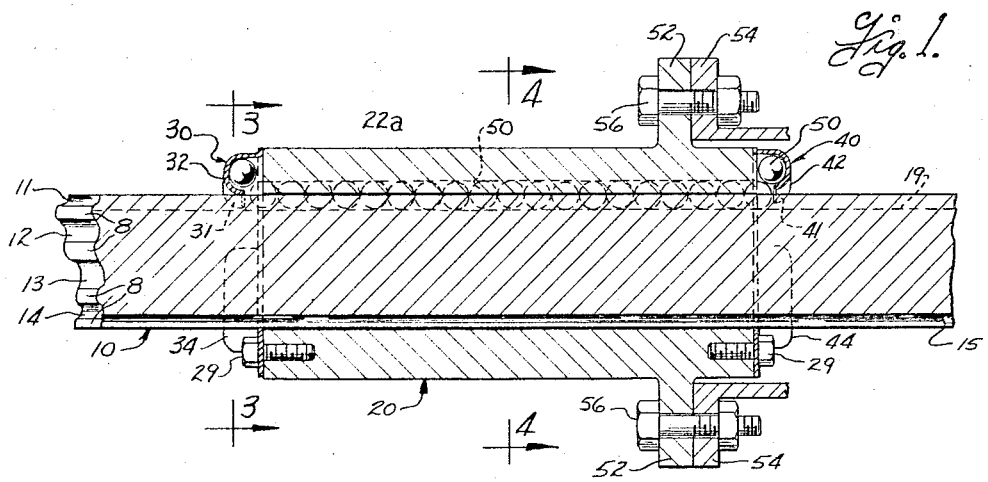
Fig. 1.
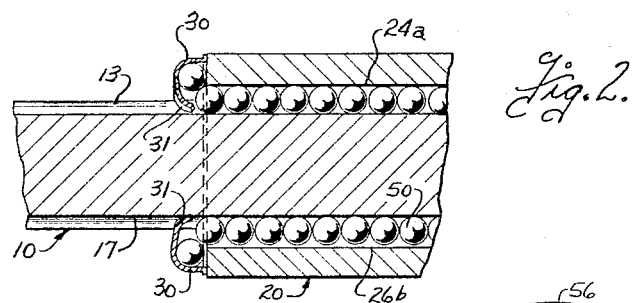
Fig. 2.
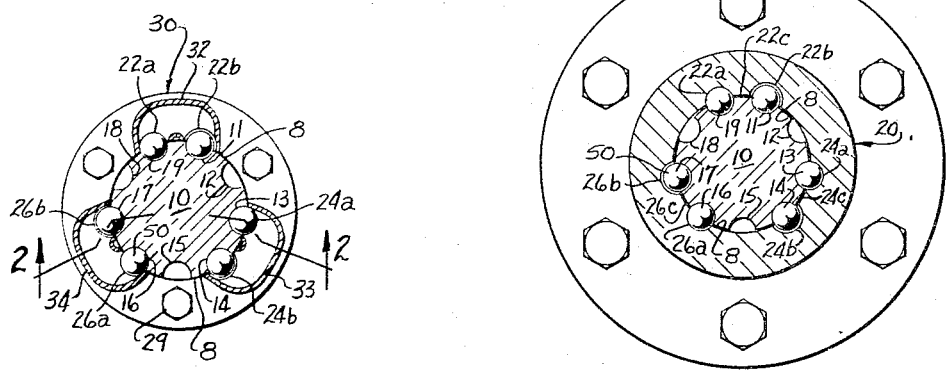
Fig. 3.
Fig. 4.
Inventor
Zan E. Hufstedler
Edmund G. Anderson
By
McCanna, Morsbach & Pillote
Attorneys 3,364,699
ANTI-FRICTION SLIP JOINT
Zan E. Hufstedler and Edmund B. Anderson, Rockford, Ill., assignors, by direct and mesne assignments, to Edmund B. Anderson and Walter H. Stark, Rockford, Ill., jointly
Filed Mar. 22, 1965, Ser. No. 441,535
11 Claims. (Cl. 64—23.7)

ABSTRACT OF THE DISCLOSURE

A shaft having roll-formed grooves extending its entire length. A short sleeve surrounding the shaft and having three pairs of grooves, each pair overlying two adjacent shaft grooves. Balls carried by the sleeve and arcuate returns at each end of the sleeve to transfer the balls from one groove to the other of each pair of grooves.

---

This invention relates to slip joints and particularly to anti-friction slip joints.

Various objects of this invention are to provide an anti-friction slip joint which can be easily and economically fabricated; which is adaptable for use in applications requiring long movement of the slip joint; which provides smooth operation; and which is rugged and durable.

A more particular object of this invention is to provide a slip joint including a shaft having a plurality of annularly spaced longitudinal grooves in the outer surface thereof and substantially extending the length of the shaft.

Another object is to provide a slip joint having a shaft in accordance with the foregoing object in which the grooves may be formed by roll forming.

Still another object of this invention is to provide a slip joint in accordance with the above objects and including a shaft and a sleeve surrounding the shaft and wherein the grooves or races for the anti-friction ball elements are all formed at the interface between the shaft and the sleeve to facilitate formation of the races, and in which the anti-friction elements are carried by the sleeve thereby facilitating long movement of the sleeve on the shaft.

These, together with various ancillary objects and advantages of this invention will be more readily appreciated as the same becomes better understood by reference to the following detailed description and the accompanying drawings wherein:

FIGURE 1 is a longitudinal sectional view taken through the center of the slip joint of the present invention;

FIG. 2 is a fragmentary longitudinal sectional view taken along irregular plane 2—2 of FIG. 3;

FIG. 3 is a transverse sectional view taken on plane 3—3 of FIG. 1; and

FIG. 4 is a transverse sectional view taken on the plane 4—4 of FIG. 1.

In general, the slip joint comprises a shaft member 10 having a smooth cylindrical outer surface, and a sleeve member, generally designated by the numeral 20, which has a smooth cylindrical inner surface. The shaft and sleeve are slidably and non-rotatably interconnected with the smooth cylindrical inner surface of the sleeve having a sliding fit with the outer surface of the shaft so as to guide the sleeve therealong and prevent tilting or cocking of the sleeve on the shaft when lateral pressure is applied to the slip joint. Races or guideways for anti-friction bearing elements or balls 50 are all located at the interface between the shaft and the sleeve and balls are disposed in the races or guideways.

More particularly, the shaft 10 has a plurality of longitudinal grooves 11 to 19. The slip joint is advantageously so constructed as to enable forming the grooves by an economical roll forming operation and the grooves extend the entire length of the shaft. In the embodiment illustrated, there are nine such grooves in the shaft; however, it should be understood that a greater or lesser number of grooves may be provided if desired. It is preferable, however, that the number of grooves in the shaft be a multiple of three for the purpose which will hereinafter be apparent. The grooves in the shaft are annularly and preferably equally spaced apart thus defining a guide rib 8 therebetween.

The sleeve 20 has a plurality of pairs of longitudinally extending semi-circular grooves formed in the inner surface thereof. As illustrated, three pairs of grooves are provided and designated 22a and 22b, 24a and 24b, and 26a and 26b. The grooves of each pair are annularly spaced apart and define a guide rib therebetween, respectively designated 22c, 24c, and 26c. In the embodiment illustrated, each groove in the sleeve is arranged to overlie and cooperate with a groove in the shaft to form a race or guideway for anti-friction elements 50. In this manner each pair of grooves in the sleeve overlies a pair of grooves in the shaft and describes a pair of guideways or races. It should be understood that a greater or lesser number of pairs of grooves may be provided if desired; as illustrated however, there are a pair of grooves in the sleeve for each three grooves in the shaft.

In the preferred form, the grooves in the shaft are of equal size and equally spaced apart and the grooves in the sleeve are arranged to overlie any two grooves in the shaft. Preferably one groove of each pair in the sleeve is enlarged to define a return race and are illustrated as grooves 22b, 24b, and 26b. The other groove of each pair, designated 22a, 24a, and 26a is of a size to receive the anti-friction elements and describe drive races whereby rotation of the shaft 11 or sleeve 20 transfers the motion through the elements 50 in the drive race to the other member. For example, when the shaft 10 is driven in a clockwise direction as viewed in FIG. 4, the balls 50 in grooves 19, 13, and 16 will be firmly pressed by the shaft against the ribs 22c, 24c, and 26c, respectively. Likewise, when the shaft 10 is driven in a counterclockwise direction as viewed in FIG. 4, the balls in grooves 19, 13, and 16 will be firmly pressed by the shaft against the side of grooves 22a, 24a, and 26a, respectively, opposite the aforementioned ribs. As a result, when the shaft 10 is moved relative to the sleeve 20, the balls 50 in the aforementioned drive races will tend to roll in the direction of movement of the shaft, and the balls in the return races must move in the direction opposite the direction of the movement of the shaft. For this purpose enlarged return races are provided to prevent binding of the balls 50 in the guideway when the shaft is laterally moved relative to the sleeve. In this manner, all wear is concentrated in the drive race; however, since the grooves in the sleeve 20 are adjustable over any pair of grooves in the shaft 10, the drive race may be moved from groove to groove in the shaft thus dividing the wear in the shaft between the three grooves corresponding to the pair of grooves in the sleeve.

From the foregoing it is deemed apparent that the plurality of grooves 11 to 19 in the shaft 10 are of equal size and equal spacing and are advantageously so formed by a roll forming operation. Since the grooves in the shaft are roll formed the entire length of the shaft, it is preferable that the size and spacing not be altered after roll forming. As a result, it is contemplated that any tolerances or alternate arrangements be formed in the sleeve 20 as described supra, the preferred form has one groove of each pair on the sleeve enlarged to define a return race. Alternatively, both grooves of each pair of grooves in the sleeve 20 may be enlarged slightly in a manner so that when the shaft 10 is driven in a clockwise direction as viewed in FIG. 4, the balls in grooves 19, 13, and 16 will be firmly pressed by the shaft against the ribs 22c, 24c, and 26c, respectively. When the shaft 10 is driven in a counterclockwise direction in this alternate arrangement, the balls in grooves 11, 14, and 17 will be firmly pressed against the ribs 22c, 24c and 26c, respectively. In this manner, the drive race is determined by the direction of rotation of the shaft and sleeve and the return race is defined by the other groove of the pair of grooves in the sleeve. In another alternate arrangement, the ribs 22c, 24c and 26c may be slightly cut away or substantially removed. In this arrangement, when the shaft 10 is driven in a clockwise direction, the balls in grooves 11, 14, and 17 will be pressed by the shaft against the outer wall of grooves 22b, 24b and 26b, respectively, which is the wall away from the ribs as viewed in FIG. 4. When driven in a counterclockwise direction in this arrangement, the balls in grooves 19, 13, and 16 will be forced against the outside wall of grooves 22a, 24a, and 26a, respectively. The foregoing examples have been made by way of illustration and not limitation and it should be understood that grooves may be otherwise arranged as may be obvious to those skilled in the art. It can be seen, however, that necessary tolerances and alternate arrangements are formed in the sleeve 20 which is considerably shorter than the shaft 10. In this manner, it is less costly to provide alternate arrangements than it would be to do so in the shaft.

In the embodiment illustrated, arcuate guideways are provided in the ends of the sleeve 20 to guide anti-friction elements from one guideway over the rib 8 on the shaft 10 and across the end of the rib on the sleeve 20 into the other guideway. For this purpose there has been provided ring members 30 and 40 which are formed separate from the sleeve 20. The ring members are disposed at opposite ends of the sleeve and are secured to the sleeve by means of a plurality of fasteners 29. The rings 30 and 40 each loosely surround the outer bearing surface on the shaft 10 and have portions 31 and 41, respectively, which extend into the grooves in the shaft. Arcuate recesses 32–34 are formed in the inner face of ring 30 to define the aforementioned arcuate guideways at the end of each pair of grooves in the sleeve. Likewise arcuate recesses are formed in the inner face of ring 40 and two such recesses 42, 44 are shown in FIG. 1. As illustrated best in FIG. 3, there is an arcuate guideway in each ring individual to each pair of grooves in the sleeve 20. The arcuate recesses extend over the rib 8 on the shaft 10 and across the end of the rib in the sleeve 20. The longitudinal guideways formed by each pair of grooves in the sleeve and the cooperating grooves in the shaft, and the arcuate guideways formed by the recesses in the end rings thus define an endless path in which a set of anti-friction elements, designated 50, are disposed in each such endless path to generally fill the guideways.

From the foregoing it is deemed apparent that the guideways formed by the grooves in the shaft 10 and sleeve 20 are all located at the interface of the shaft and sleeve. In this manner the grooves in the shaft may be formed by roll forming and the grooves in the sleeve can be formed by simple broaching operation. The sleeve 20 is arranged to function as the carrier for the anti-friction elements 50 so that the relative permissible movement between the shaft and sleeve is limited only by the length of the shaft 10 since the grooves in the shaft generally extend the full length of the shaft as formed by the roll forming operation. This permits the sleeve to be relatively short and the grooves 22a, 22b, 24a, 24b, 26a and 26b therein can be easily broached or otherwise formed. The arcuate rings 30 and 40 are formed separately from the sleeve to facilitate the forming thereof and are so constructed and arranged that the recesses therein can be easily formed by simple stamping operation.

The slip joint of the present invention is designed to be removable for repair or replacement of the joint. For this purpose, by way of illustration, a collar 52 is formed adjacent one end of the sleeve 20 and is attachable to a flange 54 of a drive tube as by a plurality of fasteners 56. Since the slip joint works equally well whether the shaft or sleeve is the driven part, it should be understood that the term "drive tube" includes driven members as well as drive members. Since the grooves 11 to 19 on the shaft 10 are equal in size and spacing, assembly or replacement of the sleeve 20 on the shaft is a relatively simple operation since the grooves in the sleeve can overlie any grooves in the shaft.

While we have thus described the specific embodiment of the invention, this has been done by way of illustration and not limitation and we do not wish to be limited except as required by the appended claims.

We claim:

1. A slip joint comprising an elongate shaft having a plurality of generally equally spaced longitudinal grooves in the outer surface of said shaft and defining ribs therebetween, said grooves substantially extending the length of said shaft, a generally tubular sleeve encompassing said shaft and having a plurality of pairs of longitudinally extending annularly spaced grooves in the inner face and defining a rib therebetween, each said pair of grooves overlying two adjacent grooves in said shaft and cooperating therewith and defining a pair of longitudinally extending ball races separated by said ribs on the shaft and sleeve, means adjacent each end of the sleeve defining arcuate ball guideways connecting together the ends of each pair of ball races and extending over the rib on the shaft, each said pair of ball races and the arcuate ball guideways connected therewith defining an endless path, and a plurality of anti-friction ball elements in said ball races and movable therein said endless path as said sleeve and shaft axially move relative to each other, said shaft having a length substantially greater than the length of said sleeve to permit said axial movement of the sleeve intermediate the ends of the shaft.

2. A slip joint comprising an elongate shaft having a plurality of annularly spaced longitudinal grooves in the outer surface thereof and substantially extending the length of the shaft, each two grooves in said shaft spaced apart and defining a rib therebetween, a generally tubular sleeve encompassing said shaft and having a plurality of groove means in the inner face, each said groove means overlying two adjacent grooves in said shaft and defining a pair of longitudinally extending ball races separated by the rib between said two adjacent grooves in the shaft, a pair of rings formed separate from said sleeve and attached to opposite ends thereof, each ring having an arcuate recess in the inner face thereof defining an arcuate ball guideway connecting together the ball races and extending over the rib on the shaft, each said pair of ball races and the arcuate ball guideways connected therewith defining an endless path, and a plurality of anti-friction ball elements in said ball races and movable along the endless path as the sleeve and shaft are axially moved relative to each other, said shaft having a length substantially greater than the length of said sleeve to permit axial movement intermediate the ends of the shaft.

3. A slip joint comprising a tubular sleeve anti-friction carrier having a substantially smooth cylindrical inner surface, said sleeve having a plurality of pairs of longitudinally extending grooves formed in the inner surface with the grooves of each pair annularly spaced apart and defining a rib therebetween, the grooves of adjacent pairs annularly spaced apart and providing an inner bearing surface therebetween, a shaft extending through said sleeve and having a substantially smooth cylindrical outer surface having a plurality of longitudinally extending grooves therein and defining ribs therebetween, each said pair of grooves in the sleeve generally overlying two grooves in said shaft and defining a pair of longitudinally extending annularly spaced guideways separated by said ribs on the shaft and sleeve, said grooves in the shaft annularly spaced apart and providing an outer bearing surface therebetween having a sliding fit with said inner bearing surface on the sleeve, means at the ends of the sleeve defining arcuate guideways connecting the ends of each pair of guideways and extending over the rib on the shaft separating said guideways, each said pair of guideways and the arcuate guideways connected therewith defining an endless path, and a plurality of anti-friction ball elements in said guideways and movable therein in said endless path as said sleeve and shaft axially move relative to each other, said shaft having a length substantially greater than the length of said sleeve to permit said axial movement intermediate the ends of the shaft.

4. A slip joint comprising an elongate shaft having a substantially smooth cylindrical outer bearing surface having nine generally equally spaced longitudinal grooves therein, said grooves in the shaft substantially extending the length of said shaft and defining guide ribs therebetween, a generally tubular sleeve encompassing said shaft and having a substantially smooth cylindrical inner bearing surface having a sliding fit with the outer bearing surface on the shaft, said sleeve having six longitudinally extending grooves formed in the inner surface thereof, said grooves arranged in pairs defining a guide rib therebetween and generally overlying two adjacent grooves in the shaft and cooperate therewith and defining a pair of longitudinally extending annularly spaced ball races separated by said guide ribs in the shaft and sleeve, a pair of annular rings formed separate from said sleeve and attached at opposite ends thereof, each said rings loosely surrounding said outer bearing surface on the shaft and having three arcuate recesses formed in the inner face thereof defining arcuate ball guideways connecting the ends of each of said pair of ball races, said arcuate ball guideways having an end portion extending into each respective groove in the shaft connected therewith and having an intermediate portion extending over the rib on the shaft separating said pair of ball races, each said pair of ball races and the arcuate ball guideways connected therewith defining an endless path, and a set of anti-friction ball elements in each said endless path and movable therein as said sleeve and shaft axially move relative to each other, one of said ball races in each said pair having clearance around the ball elements therein for providing substantially free return movement of the ball elements as they move in said endless path, said shaft having a length substantially greater than the length of said sleeve to permit said axial movement intermediate the ends of the shaft.

5. A slip joint comprising a shaft having a plurality of generally equally spaced longitudinal grooves in the outer surface of said shaft and defining ribs therebetween, said grooves substantially extending the length of said shaft, a tubular sleeve substantially encompassing said shaft and having a pair of longitudinally extending spaced grooves in the interface and defining a rib therebetween, said pair of grooves overlying two adjacent grooves in said shaft and cooperating therewith and defining first and second longitudinally extending ball races separated by said ribs on the shaft and sleeve, an arcuate ball guideway at each end of the sleeve and connecting together said first and second ball races, each said arcuate ball guideway having a portion extending into a respective groove in the shaft and a portion intermediate the grooves extending over the rib on the shaft and across the end of the rib on the sleeve, said first and second ball races and the arcuate ball guideways on the ends of the sleeve defining an endless path, and a plurality of anti-friction ball elements in said ball races and movable therein in said endless path as said sleeve and shaft axially move relative to each other, said shaft having a length substantially greater than the length of said sleeve to permit said axial movement intermediate the ends of the shaft.

6. A slip joint comprising a shaft having a plurality of spaced longitudinal grooves in the outer surface of said shaft and defining ribs therebetween, said grooves substantially extending the length of said shaft, a generally tubular sleeve encompassing said shaft and having a plurality of pairs of longitudinally extending annularly spaced grooves in the inner face and defining a rib therebetween, each said pair of grooves overlying two adjacent grooves in said shaft and cooperating therewith and defining a pair of longitudinally extending ball races separated by said ribs on the shaft and sleeve, a pair of sleeve encompassing rings formed separate from said sleeve and attached to opposite ends thereof, said rings having arcuate recesses in the inner faces thereof and each defining an arcuate ball guideway extending over the rib on the shaft, said rings having portions thereof extending radially inwardly into the grooves in the shaft defining the ball races, each said pair of ball races and the arcuate ball guideways connected therewith defining an endless path, and a plurality of anti-friction ball elements in said ball races and movable therein in said endless path as said sleeves and shaft axially move relative to each other, said shaft having a length substantially greater than the length of said sleeve to permit said axial movement of the sleeve intermediate the ends of the shaft.

7. A slip joint comprising an elongate shaft having a plurality of annularly spaced longitudinal grooves in the outer surface thereof and defining ribs between adjacent grooves, said grooves substantially extending the length of said shaft, a generally tubular sleeve encompassing said shaft and having groove means in the inner face and overlying two adjacent grooves in said shaft and defining a pair of longitudinally extending ball races separated by the rib between said two adjacent grooves in the shaft, means on the ends of the sleeve defining an arcuate ball guideway connecting together the ends of said ball races and extending over said rib between said two adjacent grooves in the shaft, said ball races and said ball guideways defining an endless path, and a plurality of anti-friction ball elements in said ball races and movable therein as the sleeve and shaft are axially moved relative to each other, said shaft having a length substantially greater than the length of said sleeve to permit said axial movement intermediate the ends of the shaft.

8. A slip joint as set forth in claim 3 wherein the last-mentioned means comprises an annular ring at each end of the sleeve and generally encompassing the shaft, each ring having arcuate recesses formed in the inner face thereof defining the arcuate guideways, means at each end of each arcuate guideway extending into a respective groove in the shaft for lifting the anti-friction ball elements out of the guideways up and over the rib in the shaft.

9. A slip joint comprising a shaft having a plurality of spaced longitudinal grooves in the outer surface thereof and defining ribs therebetween, a tubular sleeve substantially encompassing the shaft and having an inner surface adjacent the shaft, the tubular sleeve having groove means in the inner surface overlying two grooves in the shaft and therewith defining first and second longitudinally extending spaced guideways separated by one of the shaft ribs, a plurality of anti-friction ball elements in the guideways transferring the drive force between the shaft and sleeve as they are rotated, and arcuate return means at each end of the groove means extending over the shaft rib and connecting together the first and second guideways for lifting the anti-friction ball elements from one guideway up and over the shaft rib to the other guideway as the shaft and sleeve move longitudinally relative to each other.

10. A slip joint as set forth in claim 9 wherein one of said guideways has clearance around the anti-friction ball elements providing substantially free return movement of the anti-friction elements, and the other of said guideways and the anti-friction elements therein transferring the drive force in both directions of rotation of the shaft and sleeve.

11. A slip joint operable for transferring drive force in two directions and comprising a shaft having a plurality of spaced longitudinally extending grooves in the outer surface thereof and defining ribs therebetween, a tubular sleeve generally encompassing the shaft and having an inner surface adjacent the shaft, the sleeve having at least one pair of grooves in said inner surface and having a rib therebetween, said sleeve grooves overlying two shaft grooves and therewith defining first and second longitudinally extending ball guideways spaced apart by the ribs on the shaft and sleeve, a plurality of antifriction balls in said ball guideways, the balls in one of said ball guideways transferring the drive force in both directions, and arcuate ball return means at each end of the ball guideways for lifting the balls up and over the shaft rib therebetween as the shaft and sleeve move longitudinally relative to each other.

References Cited

UNITED STATES PATENTS

| | | | |
|---|---|---|---|
| 2,845,782 | 8/1958 | Glover | 64—23 |
| 2,890,594 | 6/1959 | Galonska | 308—6 X |
| 2,891,823 | 6/1959 | Galonska | 308—6 |
| 2,908,152 | 10/1959 | Anderson | 308—6 X |
| 2,979,147 | 6/1961 | Naumann | 308—6 X |
| 2,995,908 | 8/1961 | Mazziotti | 308—6 X |
| 3,046,808 | 7/1962 | De Mart | 308—6 X |
| 3,143,867 | 8/1964 | Anderson | 64—23 |
| 3,248,900 | 5/1966 | Shunts | 308—6 X |

MARTIN P. SCHWADRON, *Primary Examiner.*

L. L. JOHNSON, *Assistant Examiner.*